United States Patent [19]

Lavene

[11] Patent Number: 4,547,832
[45] Date of Patent: Oct. 15, 1985

[54] METALLIZED FILM WOUND CAPACITOR HAVING MINIMIZED INDUCTIVE REACTANCE AND METHOD THEREFOR

[75] Inventor: Bernard Lavene, Ocean, N.J.

[73] Assignee: Electronic Concepts, Inc., Eatontown, N.J.

[21] Appl. No.: 586,013

[22] Filed: Mar. 5, 1984

[51] Int. Cl.$^4$ .......................... H01G 1/14; H01G 7/00
[52] U.S. Cl. .................................... 361/307; 29/25.42
[58] Field of Search .............................. 361/306–310; 29/25.42

[56] References Cited

U.S. PATENT DOCUMENTS

| 3,364,401 | 1/1968 | Rayburn | 29/25.42 X |
| 3,513,369 | 5/1970 | England et al. | 361/308 |
| 4,345,298 | 8/1982 | Grahame | 29/25.42 X |
| 4,477,953 | 10/1984 | Lobo et al. | 29/25.42 |

FOREIGN PATENT DOCUMENTS 869511 3/1953 Fed. Rep. of Germany ..... 29/25.42

Primary Examiner—Donald A. Griffin
Attorney, Agent, or Firm—Ratner & Prestia

[57] ABSTRACT

A method is disclosed for making a wound capacitor having decreased inherent inductance and a high self-resonant frequency. In making this capacitor, metallized film is wound around a non-conductive polycarbonate core and a conductor is inserted through the entire length of the core. The wound metallized film is flattened and terminals are formed at opposite ends of the flattened wound capacitor. The conductor is folded over and electrically connected to one terminal and a metal contact is electrically connected to the other terminal. The electromagnetic field created around the conductor is approximately equal and in the opposite direction to the electromagnetic field created around the wound metallized film. Therefore, the inductive reactance of the conductor and the inductive reactance of the wound film are approximately equal. These reactances approximately cancel resulting in increased self-resonant frequency.

13 Claims, 4 Drawing Figures

METALLIZED FILM WOUND CAPACITOR HAVING MINIMIZED INDUCTIVE REACTANCE AND METHOD THEREFOR

BACKGROUND OF THE INVENTION

A. Field of the Invention

This invention relates to the field of metallized film wound capacitors and particularly to high current capacitors used in high frequency applications.

B. Prior Art

Every capacitor has a certain amount of inherent inductance. This inductance, combined with the intended capacitance, forms a resonant circuit. Higher unintended inductance causes the capacitor to resonate at a lower frequency, thus limiting the usefulness of the capacitor for high frequency applications. Thus, many capacitors which are adequate for routine applications may not be adequate in the portion of the radio frequency range above 50 kilohertz for example. In high current applications, such as switching power supplies, where capacitors have a large physical size and a consequently lower equivalent series resistance, this problem is critical. In order to limit this undesired parasitic inductance inevitably created when making a capacitor, various physical structures have been used to cause the inductive reactance of various sections of the capacitor to cancel.

A successful method previously used to limit the inherent inductance of capacitors took advantage of the physical principle that two parallel conductors carrying essentially the same current in opposite directions create approximately equal electromagnetic fields whose directions are in opposition. The closer in physical distance that these two parallel conductors were placed the more nearly completely the electromagnetic fields cancelled each other. The theoretical ideal would be achieved if the two conductors occupied the same physical space. A close approximation to this ideal would be to place one conductor entirely inside the other. This has been effectively achieved by completely enclosing the wound capacitor in a metal can. One electrode of the capacitor was internally electrically connected to one end of the can and the other electrode was electrically connected to a lead which exited the can at the opposite end. The wound capacitor itself may be conceptualized as one conductor and the metal cans surrounding it may be conceptualized as a second conductor thereby creating two parallel conductors, one within the other, constantly carrying current in opposite directions. While this arrangement effectively minimized inherent inductance, thereby increasing resonant frequency, it was undesireably expensive and inefficient in the amount of capacitance per unit volume.

The following patents were located in a search directed to this invention but upon review were not found to be relevant:

| U.S. Pat. No. | Inventor(s) |
| --- | --- |
| 3,156,854 | H. Beyer |
| 3,153,180 | A. J. Bellmore |
| 3,163,917 | D. L. Bilsing et al. |
| 3,149,398 | Sprague et al. |
| 3,292,053 | A. DiGiacomo |
| 2,985,803 | J. B. Brennan |

It is therefore an object of this invention to minimize inherent inductance by effectively placing one conductor within a second conductor thereby cancelling inductive reactance and maximizing the self resonant frequency.

A further object is to optimize the cancellation of inductive reactance relatively inexpensively.

A final object is to provide a capacitor with a large value of capacitance with high current carrying capability which may be operated at a high frequency.

SUMMARY OF THE INVENTION

A method is disclosed for making a wound capacitor having decreased inherent induction and a high self-resonant frequency. In making this capacitor, metallized film is wound around a non-conductive core and a conductor is inserted through the entire length of the core. The wound metallized film is flattened and terminals are formed at opposite ends of the flattened wound capacitor. The conductor is electrically connected to one terminal and a metal contact is electrically connected to the other terminal. The inductive reactance of the conductor approximately equals the inductive reactance of the wound metallized film. These reactances approximately cancel resulting in increased self-resonant frequency.

DETAILED DESCRIPTION OF THE INVENTION

Figure 1:
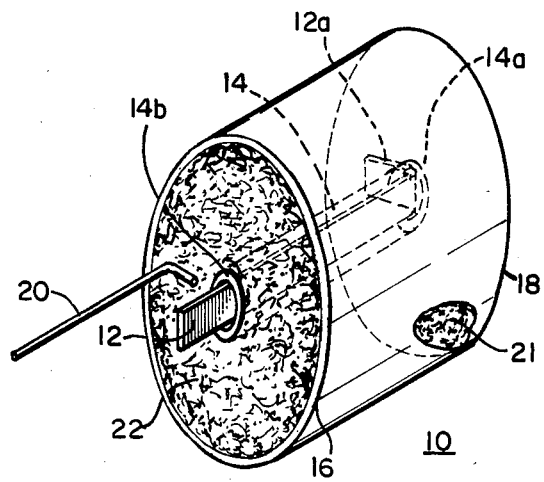
FIG. 1 is an illustration of an intermediate stage in the making of the capacitor of the present invention.

In FIG. 1 there is shown a representation of an intermediate stage in the making of an embodiment of the present invention. As shown, flattened wound capacitor 10 has ends 16 and 18 and a central axial insulated core 14 which extends beyond the ends of the capacitor by way of collars 14a,b. A rectangular copper strip 12 is housed within the entire length of core 14 and extends beyond collars 14a,b. One end of copper strip 12 is folded over to form a tab 12a which is electrically connected at its end to metal spray contact or terminal 21 at capacitor end 16. Terminal 21 may be seen through a cutaway portion of the body of capacitor 10. Wire lead 20 is electrically connected to metal spray contact or terminal 22 at capacitor end 18.

Every capacitor has a certain amount of inherent inductance. This inductance, combined with the intended capacitance, forms a resonant circuit. Higher unintended inductance causes the capacitor to resonate at a lower frequency, thus limiting the usefulness of the capacitor at high frequency applications. This effect is especially true in high current applications such as capacitors in switching power supplies which must operate in the portion of the radio frequency range between fifty and one hundred kilohertz (KH). Further complicating this problem is the fact that capacitors used in these applications have a large physical size causing a decrease in equivalent series resistance and therefore a further decrease in self resonance frequency. A fifty microfarad capacitor which would normally have a self-resonant frequency of approximately 90 KH would have its self-resonant frequency raised to approximately 120 to 130 KH if designed as in capacitor 10.

The inductance of a capacitor is normally calculated as if the capacitor were a straight 20-gauge wire. Assuming the inductance of the capacitor is that of this 20-gauge wire, the inductance may be cancelled by positioning a conductor within the center of this wire if the conductor carries the same current as the 20-gauge wire but in the opposite direction. Copper strip 12 performs the function of such an internal conductor through the center of the 20-gauge wire conductor. Two conductors having parallel electrical paths in opposite directions tend to cancel the inductive reactance of each other. This occurs because each conductor, when carrying an electric current, is surrounded by an electromagnetic field. If the currents carried by these conductors are in opposite directions the fields created are in opposite directions. The closer the two conductors are to each other the better the fields cancel. By placing one conductor immediately within the other, this effect is optimized.

In the forming of capacitor 10, core 14 is first formed by winding approximately five to ten turns of insulating 50-gauge material. Any insulating material may be used, however it is preferable to use polycarbonate.

Capacitor 10 is wound around core 14 in conventional fashion on a central mandrel. Core 14 is trimmed to extend approximately 0.2 to 0.3 inch beyond ends 16 and 18 thereby forming core extensions or collars 14a and 14b. Upon completion of the winding, rectangular copper strip 12 is inserted within core 14. The dimensions of copper strip 12 may be in the range of six to twelve mils thick and one-quarter inch wide. Copper strip 12 has a form factor equivalent to a 16-gauge wire. Thereafter capacitor 10 is flattened in conventional manner. Copper strip 12 is a conductor with a return flow of electrons constituting an electrical path parallel to the path of the capacitor (modeled as a 20-gauge wire) but carrying current in the opposite direction.

By flattening capacitor 10 greater volume efficiency is achieved. Upon completion of the flattening, the ends of copper strip 12 and the body of the wound metallized film are protected by masking with paper tape while ends 16 and 18 of capacitor 10 are sprayed with metal to form metal spray contacts 21 and 22. This spraying is performed with a high velocity mixture of compressed air and molten fine particles of tin produced from an electric arc gun. Extension 14b serves to insulate copper strip 12 from metal spray contact 22. After spraying, copper strip 12 is folded over to form tab 12a and tab 12a is electrically connected to metal spray contact 21. Extension 14a of core 14 is flexible and is bent over and flattened when copper strip 12 is folded over to form tab 12a. The dimensions of tab 12a may be in the range of six to twelve mils thick and one-quarter inch wide.

Copper strip 12 is an inner electrode. Electrically connecting tab 12a to terminal 21 causes copper strip 12 and terminal 21 to be at the same potential. In conventional manner, L-shaped lead 20₁ is electrically connected to terminal 22. Lead 20 is shown as a 16-gauge tinned copper wire which is pre-formed into an L-shape. It serves as an external lead for capacitor 10. Alternately lead 20 may be a pre-formed L-shaped metal lug with a hole drilled near the end farthest from the body of capacitor 10 for the purpose of bolt mounting capacitor 10.

Figure 2:
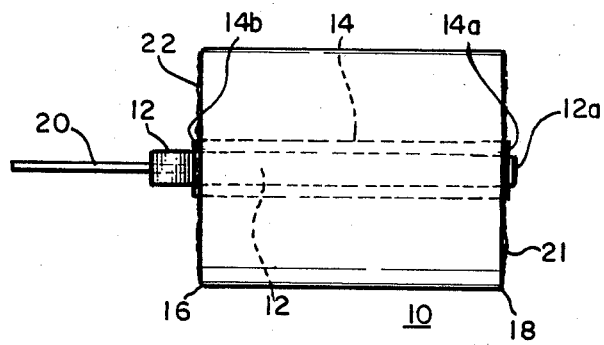
FIG. 2 is a side elevation of the capacitor of FIG. 1.

In FIG. 2, a side view of capacitor 10 is shown. Wire lead 20 is shown formed into an L-shape. Tab 12a is shown folded over and electrically connected to terminal 21. With both copper strip 12 and lead 20 now extending from end 18, capacitor 10 is essentially a coaxial capacitor.

Figure 3:
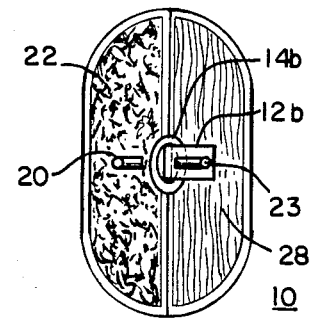
FIG. 3 is an end view of the capacitor of FIG. 1.

In FIG. 3, an insulator 28 is shown disposed onto one-half of the surface of outer electrode 22. Insulator 28 may be Mylar or any high quality insulating material. Copper strip 12 is folded over insulator 28 forming tab 12b. Insulator 28 and ring 14b serve to insulate copper strip 12 from outer electrode 22. An additional L-shaped lead is soldered onto tab 12b forming lead 23. Lead 23, extending perpendicular to end 18, is offset from the center of end 18 as is the case for lead 20. This allows convenient mounting on printed circuit boards to further reduce parasitic inductance.

Figure 4:
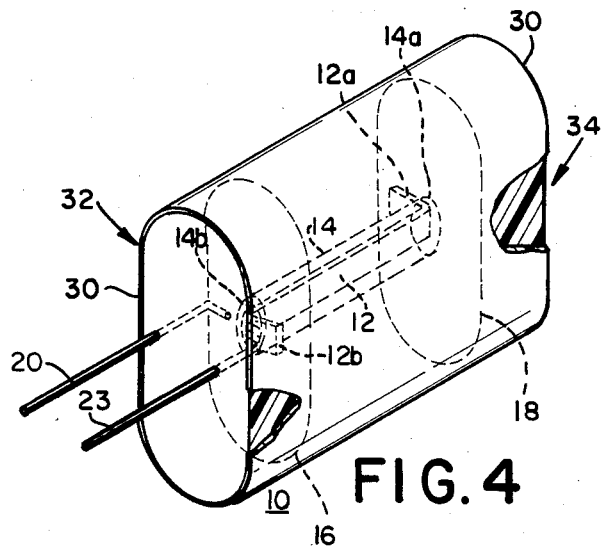
FIG. 4 is a perspective view of the capacitor of the present invention.

FIG. 4 shows capacitor 10 in completed form. Tape 30 is wrapped in conventional manner around the outer periphery of capacitor 10. This tape extends approximately three-sixteenths of an inch outwardly from terminal 21 forming cavity 32 at end 16 of capacitor 10. In a similar fashion, tape 30 extends approximately three-sixteenths of an inch outwardly from terminal 22 forming cavity 34 at end 18. External leads 20 and 23 protrude beyond cavity 32 and cavities 32 and 34 are filled in conventional manner with non-conducting epoxy.

Terminal 21 and terminal 22 have substantially identical physical characteristics. Additionally, lead 20 and lead 23 have substantially identical physical characteristics. Thus the two current paths described have substantially the same current carrying capacity. Therefore the inductive reactance of the two paths approximately cancel. Using this method, capacitor 10 resonates at a frequency approximately 30% greater than similar devices without this method. Capacitor 10 is therefore useful for high frequency applications where self-resonance frequencies above 50 kilohertz are desired.

I claim:

1. A flattened wound capacitor for use in high frequency applications having a large value of capacitance and large current carrying capability comprising:
   a metallized film wound around a flattened non-conductive oval core electrically connected to a first terminal coupled to the first end of the film, said film having a first inductive reactance and producing a first electromagnetic field;
   a conductor at least disposed within the entire length of the oval core electrically connected to a second terminal coupled to the second end of the film, said conductor of sufficient width and thickness to produce a second inductive reactance with a related second electromagnetic field in the direction opposite the first magnetic field whereby the second magnetic field substantially cancels the first magnetic field thereby subtracting the second inductive reactance from the first inductive reactance for maximizing the self resonant frequency.

2. The flattened wound capacitor of claim 1 wherein the conductor is folded over to abut the second terminal.

3. The flattened wound capacitor of claim 1 wherein the conductor comprises a rectangular metal strip.

4. The flattened wound capacitor of claim 1 wherein the nonconducting oval core comprises a polycarbonate core.

5. The flattened wound capacitor of claim 1 wherein insulator means are deposed upon a portion of the first terminal for insulating the conductor from the first terminal.

6. The flattened wound capacitor of claim 5 wherein the conductor is folded over to abut the insulator means forming a tab insulated from the first terminal and a first lead is electrically coupled to the tab.

7. The flattened wound capacitor of claim 6 wherein a second lead is electrically coupled to the first terminal and is positioned symmetrically about the center of the oval core with respect to the first lead.

8. A method for making a flattened wound capacitor for use in high frequency applications having a large value of capacitance and large current carrying capability comprising the steps of:
   (a) winding metallized film around a non-conductive core;
   (b) inserting a conductor through the entire length of the core, forming the conductor of sufficient width and thickness to produce a first inductive reactance for producing a related first electromagnetic field;
   (c) flattening the wound metallized film and the non-conductive core to form a flattened film having a second inductive reactance and a related second electromagnetic field;
   (d) forming first and second terminals at opposite ends of the wound capacitor; and
   (f) electrically connecting the conductor to the second terminal thereby forming parallel electrical paths in the conductor and the flattened film in opposite directions, the parallel electrical paths having related first and second electromagnetic fields in opposite directions for substantially cancelling the first and second electromagnetic fields and subtracting the second inductive reactance from the first inductive reactance for maximizing the self resonant frequency.

9. The method of claim 8 wherein step (d) is followed by the step of folding the conductor to abut the first terminal.

10. The method of claim 8 wherein step (b) comprises inserting a rectangular metal strip through the entire length of the core.

11. The method of claim 8 wherein step (d) includes spraying the ends of the wound capacitor with a high velocity mixture of compressed air and molten fine particles of tin.

12. The method of claim 8 wherein step (a) comprises winding a metallized film around a polycarbonate core.

13. The method of claim 8 wherein step (c) is followed by the additional step of deposing insulating material upon a portion of the second terminal.

* * * * *